3,594,394
THIOPHENE DIAMINE DERIVATIVES
John Paul Chupp, Kirkwood, Mo., assignor to Monsanto
Company, St. Louis, Mo.
No Drawing. Filed July 16, 1969, Ser. No. 842,372
Int. Cl. A01n 9/12; C07d 63/12
U.S. Cl. 260—329AM                8 Claims

ABSTRACT OF THE DISCLOSURE

Novel thiophene diamine derivatives of the formula:

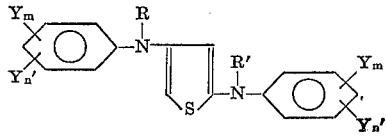

wherein R and R' are independently primary or secondary alkyl having not more than 4 carbon atoms, Y and Y' are independently selected from the group consisting of alkyl having a maximum of four carbon atoms, halogen, and nitro, and $m$ and $n$ are each integers from 0 to 2; and methods for making these compounds. These compounds have utility as herbicides, anthelmintics, and as intermediates for making insecticides.

---

This invention relates to novel thiophene diamine derivatives and their preparation. These compounds possess herbicidal and anthelmintic properties. In addition, they are valuable intermediates in the preparation of compounds having insecticidal properties.

The novel compounds of this invention are of the following formula:

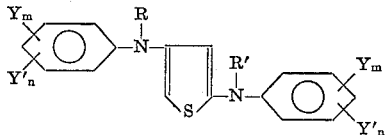

wherein R and R' are independently primary or secondary alkyl, having not more than 4 carbon atoms; Y and Y' are independently selected from the group consisting of alkyl having a maximum of four carbon atoms, halogen and nitro; and $m$ and $n$ are each integers from 0 to 2.

These novel compounds are prepared by the intermolecular cyclization reaction of α-chloro-thioacetanilides of the formulas:

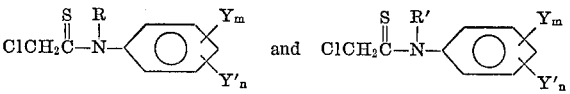

wherein R, R', Y, Y', $m$ and $n$ are as previously defined. This reaction is illustrated by the following equation:

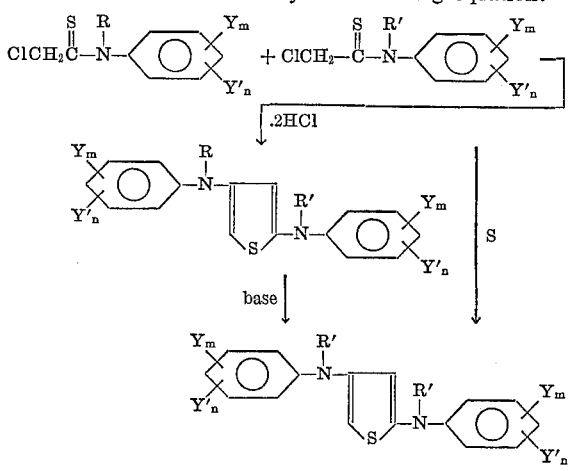

Instead of using different α-chloro-thioacetanilides, a single α-chloro-thioacetanilide can be used and the reaction involves the intermolecular cyclization of the α-chloro-thioacetanilide with itself to yield the novel compounds of this invention wherein R and R' are the same.

Preferably, only one α-chlorothioacetanilide is used in the intermolecular cyclization reaction. When different α-chlorothioacetanilides are used, isomers are obtained which require additional steps in isolating the individual isomers. Isolating the desired compound and separation of isomers are by known conventional techniques, such as fractional distillation, fractional crystallization and the like.

If two different types of α-chlorothioacetanilides are used, equal molar proportions should be used. While the use of a solvent is not essential, it is preferred that a solvent be used. Solvents that may be used include the glycols, cellosolves, alcohols, water and alcohol water mixtures. The preferred solvent is an alcohol, and preferably methanol.

Suitable glycols for the practice of this invention are ethylene glycol, dimethyl glycol, triethylene glycol, tetraethylene glycol, propylene glycol, dipropylene glycol, 1,3-butylene glycol, 1,4-butylene glycol, and the like. Suitable alcohols for the practice of this invention are ethyl alcohol, methanol, propyl alcohol, isopropyl alcohol, N-butyl alcohol isobutyl alcohol, allyl alcohol, benzyl alcohol, cyclohexanol, furfuryl alcohol, sec-butyl alcohol, tert. butyl alcohol, cetyl alcohol, crotyl alcohol and the like. Suitable cellosolve for the practice of this information are methyl cellosolve, ethyl cellosolve, butyl cellosolve, propyl cellosolve, ethylene cellosolve, propylene cellosove and the like.

The temperature at which the reaction takes place is not critical, but affects the rate at which the thiophene diamine is formed. Thus, the reaction is conveniently conducted at a temperature in the range of from about 50° C. to about 150° C., and preferably from 60° to 90° C. Although this reaction can be carried out at superatmospheric pressures or subatmospheric pressures, atmospheric pressure is generally preferred.

Higher temperatures may be utilized, especially in the absence of a solvent. Temperatures up to the melting point of the α-chlorothioacetanilide have been utilized.

The salt formed in the reaction, may be neutralized by any base, such as sodium bicarbonate, tri-ethylamine, ammonia, sodium hydroxide, potassium hydroxide and the like, sodium bicarbonate being preferred. Substantially equimolar proportions of base to the α-chlorothioacetanilide is required to neutralize the acid.

The starting substituted α-chlorothioacetanilides can be prepared by various procedures such as by the reaction of 1,2-dichlorovinylamines with hydrogen chloride-hydrogen sulfide as follows:

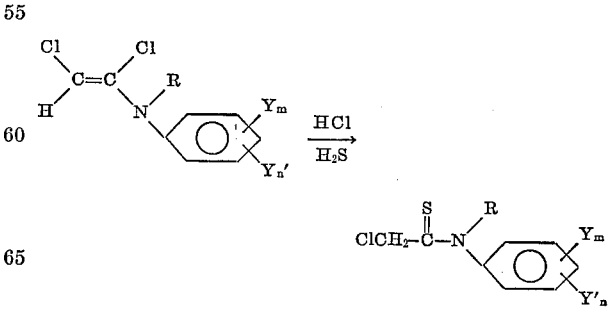

wherein R, Y, Y', $m$ and $n$ are as previously defined.

Another method is the direct sulfuration of a α-haloacetanilide, using an aryl thionophosphine sulfide, preferably a phenyl thionophosphine sulfide which is represented by the following formula:

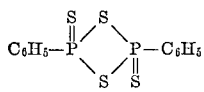

The reaction is as follows:

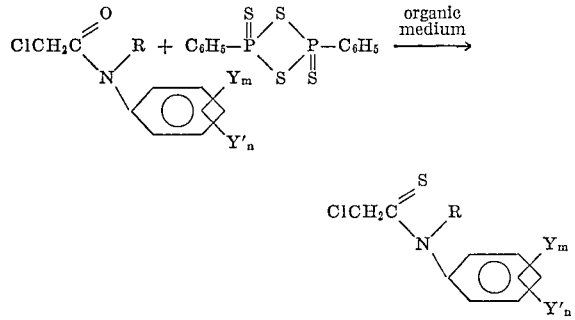

wherein R, Y and Y', m and n are as previously defined, and wherein the organic medium is selected from the group consisting of carbon disulfide, acetonitrile, toluene, benzene, chlorobenzene and carbon tetrachloride, the preferred organic meedium being carbon disulfide. In the preferred method of operation, good results are obtained when reacting two moles of the α-chloroacetanilide, to one mole of the phenylthionophosphine sulfide. The reaction is usually conducted at a temperature of from about 20° to about 50° C. In the reaction between the α-chlorothioacetanilide and the phenylthionophosphinesulfide, the materials are mixed and contacted together and the resulting mixture maintained, with agitation, for a period of time such that the α-chlorothioacetanilide is produced in the reaction zone. Good results are obtained when the reactants are mixed and agitated for a time period of about 20 minutes to 10 hours, the periods being dependent upon the nature of the reactants and the temperature employed. Hindered α-chloroacetanilides usually require longer reaction time periods and/or higher temperatures than unhindered α-chloroacetanilides.

The compounds of this invention were made according to the following examples, parts being by weight, unless otherwise noted:

EXAMPLE 1

N,N' - diisopropyl - N,N' - diphenyl - 2,4 - thiophenediamine was prepared in this example.

The α-chloro-N-isopropylthioacetanilide reactant used in this example was prepared in a suitable vessel equipped with a temperature measuring means and an agitating means. Into the vessel was charged, 16.8 parts of α-chloro-N-isopropylacetanilide and 80 parts of carbon disulfide. To this mixture was added 10.8 parts phenylthionophosphine sulfide. The resulting mixture was stirred at room temperature for about 6 hours. The carbon disulfide was removed and the residue dissolved in methylene chloride and the resultant solution eluted through alumina. Removal of solvent yielded a solid which was recrystallized from aqueous methanol—M.P. 67–68° C. The product was identified by NMR as α-chloro-N-isopropylthioacetanilide.

Into a suitable vessel was charged 13.1 parts of the α-chloro-N-isopropylthioacetanilide and 81 parts of methanol. The resulting mixture was heated under reflux for about 12 hours. Thereafter, the mixture was cooled and crystalline sulfur was removed by filtration. The resulting methanol solution was vacuum treated to remove solvent. The residue obtained was mixed with ether and the ether mixture extracted with water. The combined aqueous extracts were then neutralized with sodium bicarbonate and then extracted with ether. The latter combined ether extracts were dried over anhydrous magnesium sulfate, filtered and the ether removed yielding an oil which solidified on standing. The product obtained was recrystallized from cold pentane—M.P. 74° C.

*Analysis.*—Calculated for $C_{22}N_{26}N_2S$: M.W., 350; C, 75.4; H, 7.44; N, 8.00. Found: M.W., 350 (by mass spec.), C, 75.0; H, 7.94; N, 8.01. Spectral results are as follows: UV λ max. (ethanol) 254 (ε=15,000), 322 (ε=15,000); NMR (CCl$_4$, δ 1.20 (d, 12, J=7 Hz., CH(CH$_3$)$_2$), 3.9–4.5 (2m, 2, J=7 Hz., CH(CH$_3$)$_2$), 6.17 (d, 1, J=1 Hz., thiophene—3H), 6.28 (d, 1, J=1 Hz., thiophene—5H), 6.6–7.38 (m, 10, Aromatic H).

EXAMPLE 2

N,N' - diethyl-N,N'-diphenyl-2,4-thiophenediamine was prepared by the procedure of Example 1 substituting α-chloro-N-ethylthioacetanilide for α-chloro-N-isopropylthioacetanilide to give the desired product—M.P. 27.5–29° C.

*Analysis.*—Calcd. for $C_2OH_{22}N_2S$: M.W., 322; C, 74.5; H, 6.88; N, 8.69. Found: M.W., 322 (by mass spec.), C, 74.4; H, 6.90; N, 8.58.

Following the procedure of the foregoing examples, and using the appropriate N-disubstituted α-chlorothioacetanilide, the following 2,4-thiophenediamine derivatives were prepared.

Example:
- 3 _____ N,N'-dimethyl-N,N'-diphenyl-2,4-thiophenediamine.
- 4 _____ N,N'-diisopropyl-N,N-diphenyl-2,4-thiophenediamine.
- 5 _____ N,N'-dibutyl-N,N'-diphenyl-2,4-thiophenediamine.
- 6 _____ N-methyl-N'-propyl-N,N'-diphenyl-2,4-thiophenediamine.
- 7 _____ N-methyl-N'-ethyl-N,N'-diphenyl-2,4-thiophenediamine.
- 8 _____ N-methyl-N'-butyl-N,N'diphenyl-2,4-thiophenediamine.
- 9 _____ N-methyl-N'-isopropyl-N,N'-diphenyl-2,4-thiophenediamine.
- 10 _____ N-methyl-N'-propyl-N,N'-di(4-chlorophenyl)-2,4-thiophenediamine.
- 11 _____ N-methyl-N'-ethyl-N,N'-di(2,4-dichlorophenyl)-2,4-thiophenediamine.
- 12 _____ N-methyl-N'-butyl-N,N'di(3-nitrophenyl)-2,4-thiophenediamine.
- 13 _____ N-methyl-N'-isopropyl-N,N'di(2-chloro-3-nitrophenyl)-2,4-thiophenediamine.
- 14 _____ N-ethyl-N'-propyl-N'-propyl-N,N'-di(2-butyl-3-nitrophenyl)-2,4-thiophenediamine.
- 15 _____ N-ethyl-N'-butyl-N,N'-di(2-chloro-4-butylphenyl)-2,4-thiophenediamine.
- 16 _____ N-propyl-N'-isopropyl-N,N'-di(3,4-dinitrophenyl)-2,4-thiophenediamine.
- 17 _____ N-butyl-N'-propyl-N,N'-di(2,4-diethylphenyl)-2,4-thiophenediamine.
- 18 _____ N-isopropyl-N'-propyl-N,N'-di(3-propyl-5-nitrophenyl)-2,4-thiophenediamine.
- 19 _____ N-isopropyl-N'-butyl-N,N'-di-(3-chloro-5-butylphenyl)-2,4-thiophenediamine.
- 20 _____ N-methyl-N'-isopropyl-N,N'-di(2-bromo-3-nitrophenyl)-2,4-thiophenediamine.
- 21 _____ N-ethyl-N'-butyl-N,N'-di(2-iodo-4-butylphenyl)-2,4-thiophenediamine.
- 22 _____ N-isopropyl-N'-butyl-N,N'-di(3-bromo-5-butylphenyl)-2,4-thiophenediamine.

EXAMPLE 23

A good grade of top soil is placed in aluminum pans and compacted to a depth of ⅜″ to ½″ from the top of each pan. A predetermined number of seeds of each of several plant species are placed on top of the soil in the pans. The seeds are covered with a ⅜″ layer of prepared soil, and the pan leveled. The seed-containing pans are placed on a wet sand bench and maintained for approximately 14 days under ordinary conditions of sunlight and watering. N,N'-diisopropyl-N,N'-diphenyl-2,4-thiophenediamine is applied after 14 days in spray form to the plant specimens. The herbicidal sprays are acetone-water solutions containing 0.5% by weight of the herbicide. The treated plants are placed in a greenhouse and the effects are observed and recorded approximately 14 days thereafter.

The post-emergent herbicidal activity index used in this example is based on the average percent injury of each plant species, and is defined as follows:

Numerical scale:
- 0 _____ Herbicidal activity
- 1 _____ No herbicidal activity.
- 2 _____ Slight herbicidal activity.
- 3 _____ Moderate herbicidal activity.
- 4 _____ Severe herbicidal activity. Plant is dead.

The observed data is set forth in the following table wherein the botanical type is identified by an initial in accordance with the following code:

| | |
|---|---|
| A—Morning glory | H—Crab grass |
| B—Wild oats | I—Pig weed |
| C—Brome grass | J—Sugar beets |
| D—Rye grass | K—Wild buckwheat |
| E—Radish | L—Tomato |
| F—Sugar beets | M—Sorghum |
| G—Foxtail | |

TABLE I.—POST-EMERGENT HERBICIDAL ACTIVITY

| Compound | Contact conc. | A | B | C | D | E | F | G | H | I | J | K | L | M |
|---|---|---|---|---|---|---|---|---|---|---|---|---|---|---|
| N,N'-diisopropyl-N,N'-diphenyl-2,4-thiophenediamine | 0.5% | 1 | 0 | 0 | 0 | 2 | 1 | 2 | 1 | 3 | 1 | 1 | 0 | 0 |

The compounds of this invention are also used as intermediates to make compounds with insecticidal activity, as illustrated by the following example, parts being by weight unless otherwise noted:

EXAMPLE 24

2,4-bis(N,N' - diisopropylanilino) - 5 - thienyl methyl ketone of the structure,

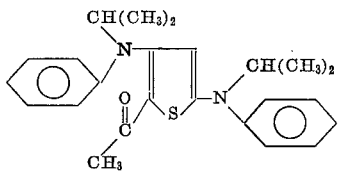

was prepared by the following procedure:

Into a suitable vessel, which contained an ether solution of 29 parts of triethylamine and 100 parts of N,N'-diisopropyl - N,N' - diphenyl-2,4-thiophenediamine, was added 24 parts of acetyl chloride with stirring. Upon standing for four hours, the mixture was filtered to remove the triethylamine hydrochloride. The ether was removed from the filtrate, and the residue crystallized from aqueous methanol to give a 23% yield of the desired product, 2,4 - bis(N,N' - diisopropylanilino) - 5 - thienyl methyl ketone. At 5 p.p.m. this compound was found to exhibit 100% control against Southern Corn Root worm.

While the illustrative embodiments of the invention have been described hereinbefore with particularity, it will be understood that various other modifications will be apparent to and can readily be made by those skilled in the art without departing from the scope and spirit of the invention. Accordingly it is not intended that the scope of the claims appended hereto be limited to the examples and description set forth herein but rather the claims be construed as encompassing all the features of patentable novelty which reside in the present invention including all features which would be treated as equivalents thereof by those skilled in the art to which the invention pertains.

What is claimed is:

1. A compound of the formula:

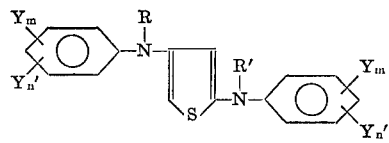

wherein R and R' are independently a primary or secondary alkyl, having at least one and a maximum of 4 carbon atoms, Y and Y' are independently selected from the group consisting of alkyl having a maximum of 4 carbon atoms, halogen and nitro; and $m$ and $n$ are each integers from 0 to 2.

2. A compound according to claim 1 in which R and R' are identical.

3. A compound according to claim 2 in which R and R' are isopropyl.

4. A compound according to claim 3 which is N,N'-diisopropyl-N,N'-diphenyl-2,4-thiophenediamine.

5. A method for preparing a compound of the formula:

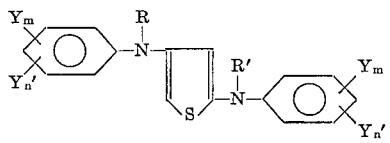

wherein R and R' are independently a primary or secondary alkyl having at least one and a maximum of four carbon atoms; Y and Y' are independently selected from the group consisting of alkyl having a maximum of four carbon atoms, halogen, and nitro; and $m$ and $n$ are integers from 0 to 2; which comprises heating at elevated temperatures from about 50° C. to the melting point of the α-chlorothio-acetanilide an α-chlorothioacetanilide selected from the group consisting of (a) 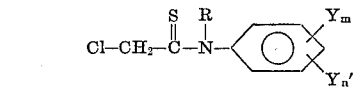

and (b) a mixture of (a) with a compound of the formula

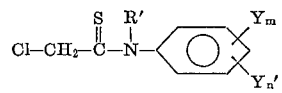

wherein R, R', Y, Y', $m$, and $n$ are as previously defined, to form an intermediate salt; and neutralizing the intermediate salt formed with a base.

6. A method according to claim 5 wherein said α-chlorothioacetanilide is

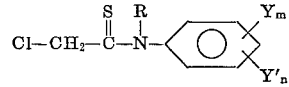

7. A method according to claim 6 in which said heating is conducted at a temperature in the range of from about 50° C. to about 150° C., in the presence of a solvent, and said base is selected from the group consisting of sodium bicarbonate, triethylamine, ammonia, sodium hydroxide and potassium hydroxide.

8. A method according to claim 7, in which said solvent is an alcohol and said base is sodium bicarbonate.

References Cited

UNITED STATES PATENTS 3,143,566  8/1964  Surrey _____ 260—490

JOHN D. RANDOLPH, Primary Examiner

C. M. SHURKO, Assistant Examiner

U.S. Cl. X.R.

71—90; 260—332.3C; 332.5; 551S; 424—202, 275